Patented May 4, 1943

2,318,265

UNITED STATES PATENT OFFICE 2,318,265

NUT PROCESS

Arthur F. Stagmeier, Upper Montclair, N. J., assignor to General Foods Corporation, New York, N. Y., a corporation of Delaware No Drawing. Application February 7, 1940, Serial No. 317,775

10 Claims. (Cl. 146—219)

The present invention relates to the treatment of nuts, particularly those in which the kernel is firmly adherent to the shell, and is directed to a method of rendering such nuts free-shelling.

Brazil nuts and coconuts are typical examples of nuts of the character to which I have reference, and since they are perhaps the most commonly known of the varieties of nuts which are difficult to shell they are used herein as illustrations of the invention, although it will be understood that the process is equally applicable to other nuts.

Various expedients have been resorted to in an effort to facilitate the removal of the shells of Brazil nuts without undue breakage of the kernels, but the procedure most commonly used commercially is the laborious one of soaking the nuts first in cold water and then in hot water to soften the shells, and then individually cracking the nuts by hand. Coconuts, likewise, are given a preliminary shell-softening treatment before being opened by hand, the customary practice being to subject the nuts to atmospheric steam for a period of from twenty minutes to an hour and then to crack the shells while they are still hot.

Both of these existing methods result in a large proportion of broken and scarred kernels on cracking, because the meat does not break free from the shell uniformly and has to be pried out in pieces or otherwise separated from the shell. Moreover, large quantities of coconuts, and particularly Brazil nuts, are marketed in the shell and are opened by the consumer under conditions which result in even greater breakage than occurs in ordinary commercial practice.

One of the objects of the present invention is to break the bond between the kernel and the shell of nuts which have closely adherent kernels in such manner that on cracking of the shell the kernel can be removed without scarring or breaking.

Another object is to effect a permanent rupture of the bond between the kernel and the shell of nuts having normally adherent kernels so that the nuts will remain free-shelling indefinitely.

I have found that the bond between the kernel and the shell of nuts such as Brazil nuts and coconuts can be broken or ruptured by appropriate application of moisture, pressure, and heat. I have found that this rupture can be accomplished by driving moisture through the shell into the connective tissue between the kernel and the shell and thereafter subjecting the nut to heat under conditions bringing about a flashing of the added moisture into steam. Whether the resulting rupture of the bond between the kernel and the shell is due to the effect of the moisture and heat of the steam on the connective tissue, or to actual mechanical distortion of the shell or kernel or both due to the pressure of the steam, is not definitely established, but the actual separation of the shell and kernel can be determined by observation of the condition of the shell and kernel after cracking.

Any suitable procedure may be used to accomplish the introduction of moisture into the nuts. Preferably, however, the introduction is effected by the use of pressure in any suitable manner so as to force or drive the moisture through the shell into the connective tissue surrounding the kernel. For example, the nuts may be immersed in water or other aqueous solution in a closed vessel at any suitable temperature, say room temperature, and subjected to pressure by means of air or other gas. It will be understood that the amount of pressure employed may be varied to suit the particular conditions of operation and the characteristics of the particular nuts being treated, but in the interest of accelerating the process and saving time and expense it is desirable to employ a substantial pressure.

In practice, I have found a pressure of about 40 lbs. per square inch to give good results for Brazil nuts, although if time is an important element in the operation, pressures as high as 100 lbs. per square inch may be employed. In the case of coconuts, however, pressures in excess of about 50 lbs. per square inch are likely to cause the hollow kernels to collapse, so a pressure of 40-45 lbs. per square inch is to be preferred in practice. With pressures of the order of 40 lbs. per square inch, the period required to effect passage of the necessary moisture through the shell into the connective tissue is only a few minutes, being about three minutes for Brazil nuts and about twelve minutes for coconuts. However, it will be understood that the treatment may be continued for longer periods if desired or if necessitated by variations in the density and thickness of the shells of the nuts.

After moisture has been introduced into the nuts as described above, they are separated from the bath and subjected to heat to cause the added moisture to flash into steam within the nuts. The application of the necessary amount of heat to bring this about is preferably done by subjecting the nuts to steam pressure in any suitable closed vessel or by immersing them in a bath of hot oil or molten wax. In practice, I have obtained satisfactory results on Brazil nuts by subjecting them to steam pressure of approximately 65 lbs. per square inch for about fifteen seconds and also by immersing them for a period of about one minute in a bath of molten wax heated to about 300° F.

It will be understood, however, that other steam pressures and bath temperatures may be used to suit particular requirements and yet obtain the same results. In the case of the steam treatment of Brazil nuts, for instance, the pressure may range from about 5 to 100 lbs. per square inch for periods of from five seconds to about three minutes, the time varying inversely with the pressure employed. Alternatively immersion in a liquid bath heated to corresponding temperatures of about 250° to 350° F. for periods varying inversely with the temperature may be used. With coconuts, on the other hand, the danger of collapsing the kernels makes it desirable to use pressures of less than 50 lbs. per square inch, but this is not objectionable for I have obtained very good results by using steam at 45 lbs. per square inch for a period of about twelve minutes. At the same time, whether Brazil nuts or coconuts are being treated, prolonged exposure of the nuts to high temperatures should be avoided as it may result in rupturing of the oil cells near the surface of the kernels and the development of an undesirable translucent appearance of the meat.

Following the heat treatment, the nuts are removed from the steam retort or liquid bath, whichever is used, and allowed to cool and dry slowly in any suitable manner. Too rapid cooling tends to cause the kernels to readhere to the shells. One method which has proven satisfactory is to place the hot nuts in a perforated metal cylinder and roll them around for a period of about five minutes. In this way, their temperature is reduced to about 100° F. at which level they can be handled readily. If the nuts are not to be cracked immediately, they may be cooled further in any suitable manner as by spreading them on a floor and allowing them to reach room temperature.

Nuts which have been treated according to the foregoing procedure are free-shelling and will remain so for indefinite periods. When cracked, the kernels separate readily from the shells and are not only removed without difficulty but also substantially without breakage. Experience has shown that the percentage of whole kernels obtained from the process as described above is materially greater than has heretofore been obtained from ordinary nuts. This result is of great importance not only from the standpoint of the manufacturer and distributor of shelled nuts but also from the viewpoint of the consumer who purchases nuts in the shell for home consumption. Moreover, the fact that the nuts remain free-shelling indefinitely makes it possible for a coconut processor to eliminate the necessity for steaming the nuts immediately prior to shelling, with the attendant disadvantage of having to handle them while hot, and permits him, by conditioning the nuts in advance, to conduct his shelling operations with a minimum of delays due to interruptions in the flow of nuts to the cracking tables.

It will be understood that the invention is not limited to the particular embodiments described above and that the details of the treatment may be varied by the individual processor to meet particular operating conditions. Moreover, the process is not restricted to Brazil nuts and coconuts but can be applied to other nuts in which similar problems of separation of shell and kernel are encountered. Reference accordingly should be made to the appended claims for a definition of the limits of the invention.

What is claimed is:

1. A method of treating whole nuts having adherent kernels to render them free-shelling which comprises immersing the nuts in an aqueous medium under pressure to increase the moisture content of the connective tissue between the kernel and shell of the nuts and thereafter subjecting the nuts to heat sufficient to convert a portion of said moisture into steam.

2. A method of treating whole nuts having adherent kernels to render them permanently free-shelling which comprises immersing the nuts in an aqueous medium under pressure to increase the moisture content of the connective tissue between the kernel and shell of the nuts, subjecting the nuts to heat sufficient to convert a portion of said moisture into steam, and slowly cooling the nuts.

3. A method of treating whole nuts having adherent kernels which comprises immersing the nuts in an aqueous medium, applying pressure to said medium to force a portion thereof inside the shells of the nuts, and subjecting the so treated nuts to steam pressure to convert the introduced moisture into steam, whereby the bond formed by the connective tissue between the kernel and shell of the nuts is ruptured and the nuts are rendered free-shelling.

4. A method of treating whole nuts having adherent kernels which comprises immersing the nuts in a water bath under a pressure of 40 to 50 lbs. per square inch to force a portion thereof inside the shells of the nuts, removing the nuts from said bath, and subjecting the nuts to steam pressure of from 5 to 100 lbs. per square inch for a period of from five seconds to three minutes, the time varying inversely with the pressure, whereby the introduced moisture is converted into steam and the bond formed by the connective tissue between the kernel and shell of the nuts is ruptured.

5. A method of treating whole nuts having adherent kernels to render them permanently free-shelling which comprises immersing the nuts in an aqueous medium under pressure to increase the moisture content of the connective tissue between the kernel and shell of the nuts, subjecting the so treated nuts to steam pressure to convert the introduced moisture into steam, and slowly cooling the nuts.

6. A method of treating whole nuts having adherent kernels to render them free-shelling which comprises immersing the nuts in an aqueous medium under pressure to increase the moisture content of the connective tissue between the kernel and shell of the nuts, removing the nuts from said medium, and immersing the nuts in a liquid bath heated to a temperature sufficient to convert a portion of said moisture into steam.

7. A method of treating whole nuts having adherent kernels to render them free-shelling which comprises immersing the nuts in an aqueous medium under pressure to force a portion thereof inside the shells of the nuts, removing the nuts from said medium, and immersing the nuts in a liquid bath heated to a temperature of from 250° to 350° F. for a period sufficient to convert said introduced moisture into steam.

8. A method of treating whole nuts having adherent kernels which comprises immersing the nuts in an aqueous medium under pressure to force a portion thereof inside the shells of the nuts, removing the nuts from said medium, immersing the nuts in a bath of a liquid heated to a temperature sufficient to convert said introduced moisture into steam, removing the nuts from said heated bath, and slowly cooling the nuts, whereby the nuts are rendered permanently free-shelling.

9. A method of treating whole nuts having adherent kernels to render them free-shelling which comprises introducing free water between the shells and kernels and then subjecting said nuts to external heat to convert at least part of said free water into steam.

10. A method of treating whole nuts having adherent kernels to render them free-shelling which comprises introducing free water between the shells and kernels and then subjecting said nuts to external heat to convert at least part of said free water into steam and then slowly cooling the nuts.

ARTHUR F. STAGMEIER.